United States Patent [19]

Chandavarkar

[11] Patent Number: 5,745,106

[45] Date of Patent: Apr. 28, 1998

[54] APPARATUS AND METHOD FOR AUTOMATIC MEASUREMENT OF RING OSCILLATOR FREQUENCY

[75] Inventor: Dinesh D. Chandavarkar, Cupertino, Calif.

[73] Assignee: Chips & Technologies, Inc., San Jose, Calif.

[21] Appl. No.: 783,270

[22] Filed: Jan. 15, 1997

[51] Int. Cl.⁶ .................................................. G09G 5/00
[52] U.S. Cl. .............................. 345/213; 345/211; 331/57
[58] Field of Search ............................. 345/212, 211, 345/112, 213; 331/57; 348/536, 537, 521

[56] References Cited

U.S. PATENT DOCUMENTS

| 4,227,185 | 10/1980 | Kronlage | 340/347 |
| 4,788,540 | 11/1988 | Tokumitsu et al. | 345/213 |
| 4,961,071 | 10/1990 | Krooss | 345/213 |
| 5,047,967 | 9/1991 | Sander et al. | 364/569 |
| 5,555,032 | 9/1996 | Kung | 345/211 |
| 5,638,028 | 6/1997 | Voth | 331/57 |

*Primary Examiner*—Richard Hjerpe
*Assistant Examiner*—Ricardo Osorio
*Attorney, Agent, or Firm*—D'Alessandro & Ritchie

[57] ABSTRACT

A ring oscillator is embedded into the same silicon wafer as the functional circuits. The output of the ring oscillator and a display clock signal are both directed into seperate inputs of a multiplexer which is controlled by the computer BIOS. When the BIOS desires to read the ring oscillator frequency, the multiplexer is switched, thus providing the output of the ring oscillator to the display status register. The resulting frequency may be used to optimize clock speeds.

7 Claims, 1 Drawing Sheet

APPARATUS AND METHOD FOR AUTOMATIC MEASUREMENT OF RING OSCILLATOR FREQUENCY

BACKGROUND OF THE INVENTION

1. Field of the Invention

The present invention relates to measuring the frequency of an on-chip ring oscillator. More particularly, a method is disclosed wherein the frequency of a ring oscillator is measured automatically, and that frequency used to determine the proper setting for clock speeds and other parameters, thus maximizing the efficiency of a computer system containing the ring oscillator.

2. The Background Art

Ring oscillators are well known in the field of integrated circuit manufacturing. A ring oscillator is implemented by connecting an odd number of gates such as inverters, XOR gates or NAND gates together such that the output of the first gate is connected to both inputs of the second gate, the output of the second gate is connected to both inputs of the third gate, and so on. The output of the last gate is connected to the both inputs of the first gate. Because an odd number of gates is presented, the circuit self-oscillates at a frequency which is approximately the inverse of the sum of the propagation delay times through each gate.

The frequency of a silicon-based ring oscillator is directly dependant on the temperature of the wafer, the supply voltage, and the quality of the process which generated the silicon wafer. Because of this, ring oscillators are often embedded in the silicon wafer separate from other functional circuitry, and are often used by manufacturers to classify assemblies as fast, average, or slow, depending on the performance of the ring oscillator. For instance, if the assembly containing the ring oscillator is a memory chip, based on the frequency of the ring oscillator, the assembly may be classified as a 60 ns, 70 ns, or 80 ns part.

The supply voltage in a system is known, and is relatively constant. Temperature tends to be relatively constant due to various cooling methods commonly used in modern-day systems. However, there are few ways to discern the device characteristics produced on the silicon wafer. The frequency of a ring oscillator of known construction is used by manufacturing facilities to determine the quality of that process.

Although the ring oscillator is useful for its intended purposes, it's use is limited to a manufacturing facility due to the difficulty of measuring the oscillator frequency. It would therefore be advantageous to provide a method wherein the frequency of the ring oscillator may by automatically measured, in real time, while a system is in operation.

OBJECTS AND ADVANTAGES OF THE INVENTION

It is an object and advantage of the present invention to provide a method for automatically measuring the frequency of an on-chip ring oscillator.

It is a further object and advantage of the present invention to provide a method of adjusting the clock speed of memory and other integrated circuits to maximize throughput based on actual operating conditions and internal system parameters.

These and many other objects and advantages of the present invention will become apparent to those of ordinary skill in the art from a consideration of the drawings and ensuing description of the invention.

SUMMARY OF THE INVENTION

The present invention comprises a method for automatically measuring the frequency of an on-chip ring oscillator and for using that frequency to optimize video memory clock speeds on a video controller card.

A ring oscillator, embedded in silicon in a video controller integrated circuit in a computer, provides an output signal to a multiplexer which selects between the display clock and the ring oscillator at such times as are determined advantageous by the computer BIOS. During a period where it might be advantageous to adjust the memory clock speed in order to optimize memory operations, such as when changing display sizes or resolution, the multiplexer is switched to provide the ring oscillator output for use as the display clock.

Because the display clock is able to be seen directly by the BIOS using a status register implemented in most modern day computers, and the ring oscillator is now being directed into the same circuit path normally provided to the display clock, the ring oscillator frequency may now be read using that same display register. The frequency of the ring oscillator is read and then used by the BIOS to optimize memory operations as necessary by advancing the memory clock frequency.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

It is to be understood that identical designation numbers of elements in different drawings constitute the same element.

Figure 1:
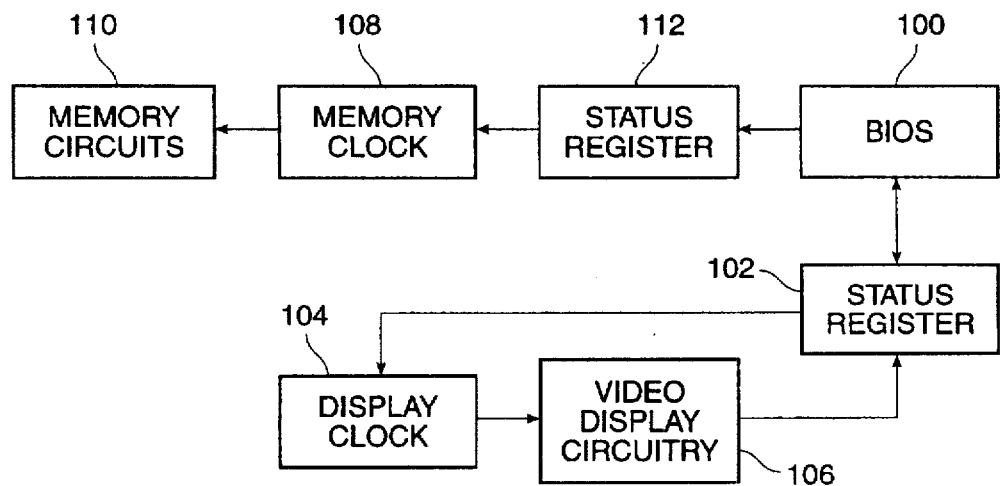
FIG. 1 is a block diagram of the prior art arrangement of a memory clock and display in a computer system.

FIG. 1 is a block diagram of the prior art arrangement of a memory clock and display in a computer system.

In a computer system, the user typically provides information in some fashion indicating to the system what type of monitor is in use. Referring to FIG. 1, the system BIOS 100, communicating through a status register 102, then sets clock frequencies to correspond with the display resolution in use. One of these frequencies is provided by the display clock 104. The frequency of the display clock is directly dependent upon the size and display resolution currently in use, and typically varies from 25 MHz to 133 MHz. Should a user change the display parameters during a typical session so that the size of the screen and resolution varies from the smallest screen with the lowest resolution, to the largest screen with the highest resolution, video circuitry 106 would see a range of display clock frequencies of 25–133 MHz from display clock 104 during that session. Changes to the frequency of the display clock 104 are accomplished by system BIOS 100 through status register 102 when the display resolution is changed.

A second clock signal in common use in computer video systems is the memory clock signal. The memory clock controls the speed of read and write operations to video memory. Because the display change rate is directly affected by the speed of memory operations, the frequency of the memory clock directly affects the speed at which display operations take place.

Typically, the memory clock is set to a fixed value which is determined statistically in the manufacturing process. Based on the results of testing a large number of finished assemblies, a manufacturer sets the memory clock frequency to a value which would enable most or all of those components to operate adequately, but which fails to take into account that some assemblies are faster or slower than others. Thus a memory circuit which can operate with a clock frequency of 35 MHz may actually see a clock frequency of 25 MHz.

The output frequency of memory clock 108 is typically set once at power up. The output of memory clock 108 is provided to memory circuits 110, and also to status register 112. In order to take advantage of the particular characteristics present in a completed assembly, it would be necessary to set the memory clock for that assembly based on characteristics present at the time the assembly is used.

It would therefore be advantageous to be able to set the memory clock frequency to operate at the fastest speed for that particular assembly, thus tailoring a particular system to operate at the highest possible efficiency. The present invention solves this problem.

Figure 2:
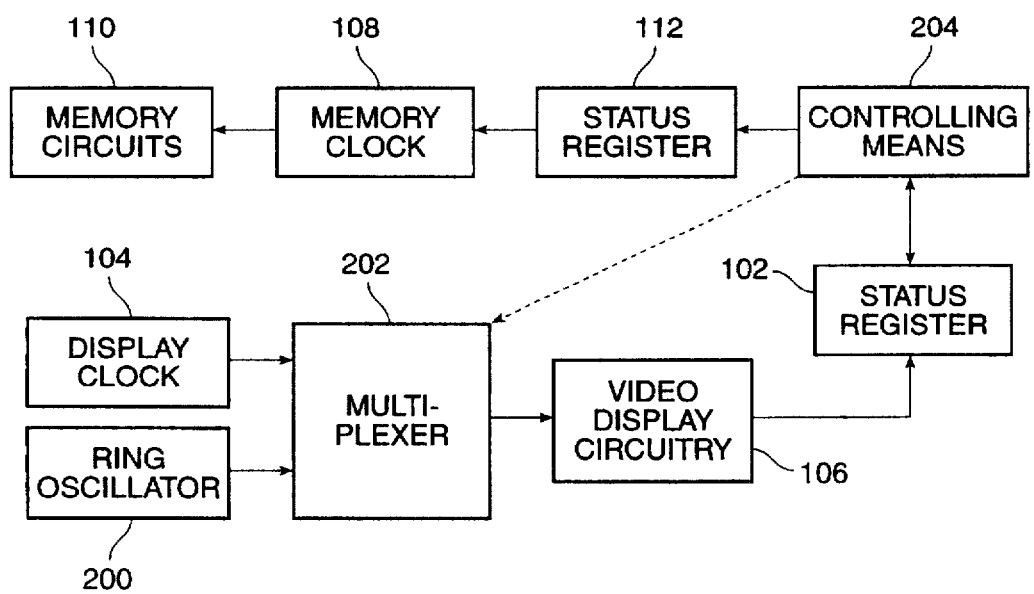
FIG. 2 is a block diagram of a presently preferred embodiment of the present invention.

FIG. 2 is a block diagram of the presently preferred embodiment of the present invention.

In accordance with the preferred embodiment of the present invention, ring oscillator 200 is formed on the same integrated circuit die as the memory circuits in use for the video display of a computer. Because the ring oscillator and the memory circuits are formed on the same integrated circuit die, an analysis of the ring oscillator frequency will give valuable information as to the speed capability of those memory circuits.

According to a presently preferred embodiment of the invention, the ring oscillator comprises 33 NAND gates, or 33 NOR gates, arranged so that the output of the first gate is tied to both inputs of the second gate, the output of the second gate is tied to both inputs of the third gate, and so on, until the output of the thirty-third gate is tied to both inputs of the first gate. This provides a clock frequency of approximately 20–30 MHz. However, frequencies between 20–133 MHz are useful in modern-day video circuitry, and it is well known in the industry to construct a ring oscillator which outputs a specific frequency.

In the embodiment described herein, the ring oscillator is used in order to determine the optimum settings for the memory clock speed on a video card in a computer system. Those of ordinary skill in the art will readily recognize that the measurement of a ring oscillator frequency using automatic means in a computer has many other uses in addition to those disclosed herein.

Referring to FIG. 2, in a preferred embodiment of the present invention, the output of ring oscillator 200 is coupled to a first data input of multiplexer 202. A second input, display clock 104 is also directed into multiplexer 202. The output of multiplexer 202, which is controlled by controlling means 204, is provided to video display circuitry 106. Thus, when controlling means 204 switches multiplexer 202, the signal from display clock 104 is replaced with the output of ring oscillator 200. Now, controlling means 204 may read the frequency of ring oscillator 200 and then decide if adjusting the frequency of memory clock 108 would be beneficial.

According to a presently preferred embodiment of the invention, controlling means 204 is the computer BIOS.

During most of the time a computer is powered on and performing functions, in the preferred embodiment, the BIOS will pass the display clock through multiplexer 202. However, during some convenient periods, the active input to multiplexer 202 will be chosen to be the ring oscillator as described in the preceding paragraph.

During the time the ring oscillator is switched in to be the primary input of multiplexer 202, the video display will be unusable, and is typically blanked. This is not seen to be an issue, as the time period the display is blanked is on the order of milliseconds.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus providing automatic measurement of the frequency of a ring oscillator disposed on an integrated circuit comprising:

a multiplexer having a first data input of which is connected to the output of the ring oscillator, a second data input, a control input, and an output;

a display clock for generating a display clock signal, said display clock having an output connected to said second data input of said multiplexer;

controlling means for switching said multiplexer between said first and second data inputs, said control means coupled to said control input of said multiplexer;

video display circuitry which controls the synchronization of a video display, utilizing said display clock signal, said video display circuitry input being connected to said output of said multiplexer, and a display register for tracking clock events, the input of said display register being provided by an output of said video display circuitry which contains the signal seen on the output of said multiplexer.

2. An apparatus of claim 1 wherein said multiplexer is a two-to-one multiplexer.

3. An apparatus of claim 1 wherein said controlling means for switching said multiplexer is the BIOS in a computer.

4. An apparatus of claim 1 wherein said ring oscillator comprises 33 NAND gates connected so that the output of every gate is coupled to the input of the next gate, and the output of the thirty third gate is coupled to the input of the first gate.

5. An apparatus of claim 1 wherein said ring oscillator comprises 33 NOR gates connected so that the output of every gate is coupled to the input of the next gate, and the output of the thirty third gate is coupled to the input of the first gate.

6. An apparatus of claim 1 wherein said ring oscillator is configured so as to have an output frequency between about 20 Mhz and about 133 MHz.

7. An method for adjusting clock speeds to correspond with optimum settings comprising:

providing a ring oscillator which is embedded in the same silicon wafer as a memory circuit to be optimized, measuring the frequency of said ring oscillator, and adjusting the frequency of a clock source for said memory circuit to be the maximum usable frequency based upon the frequency of the ring oscillator, during a period when optimized memory operations are required.

* * * * *